(12) United States Patent
O'Lenick, Jr.

(10) Patent No.: US 6,388,042 B1
(45) Date of Patent: May 14, 2002

(54) DIMETHICONE COPOLYOL ESTERS

(75) Inventor: Anthony J. O'Lenick, Jr., Dacula, GA (US)

(73) Assignee: Siltech LLC, Dacula, GA (US)

( * ) Notice: Subject to any disclaimer, the term of this patent is extended or adjusted under 35 U.S.C. 154(b) by 0 days.

(21) Appl. No.: 09/734,870

(22) Filed: Dec. 13, 2000

(51) Int. Cl.$^7$ ............... C08G 77/38; C08G 77/46
(52) U.S. Cl. ............... 528/26; 528/14; 528/15; 528/31; 528/25; 568/673; 568/675; 560/261
(58) Field of Search .................. 528/14, 15, 31, 528/26, 25; 568/673, 675; 560/261

(56) References Cited

U.S. PATENT DOCUMENTS 3,450,736 A * 6/1969 Monterey
3,560,544 A   2/1971 Hauiska
4,724,248 A   2/1988 Dexter
5,180,834 A   1/1993 Wettlaufer et al.
6,313,256 B1 * 11/2001 O'Lenick, Jr.

* cited by examiner

*Primary Examiner*—Robert Dawson
*Assistant Examiner*—Kuo-Liang Peng

(57) ABSTRACT

The present invention relates to novel dimethicone copolyol ester compounds bearing a fatty group attached through a hydrophobic ester linkage to silicon. This invention also relates a series of such products having differing amounts of water-soluble groups, silicone soluble groups and fatty soluble groups. By careful selection of the compounds so constructed, very efficient mild conditioning agents may be achieved.

18 Claims, No Drawings

DIMETHICONE COPOLYOL ESTERS

BACKGROUND OF THE INVENTION

1. Technical Field of the Invention

The present invention relates to novel dimethicone copolyol ester compounds bearing a fatty group. This invention also relates a series of such products having differing amounts of water-soluble groups, silicone soluble groups and fatty soluble groups. By careful selection of the compounds so constructed, very efficient mild conditioning agents may be achieved

2. Description of the Arts

There have been several silicone containing surfactants prepared over the years for specific applications. For example, U.S. Pat. No. 5,180,834 issued January 1993 to O'Lenick, Jr. (assigned to Siltech Corporation) teaches that reacting them with fatty acids can esterify dimethicone copolyols. The resulting product is an ester that has the fatty group linked through the alkoxylate. This particular arrangement results in a product that has surfactant properties, but are not optimized. We have surprisingly found that products made by the reaction of silicone methyl ester having 11 carbon atoms directly between the ester function and silicon atom in the poly-dimethyl siloxane backbone. These advantageous will become apparent.

We have also surprisingly found that by having a bulky alkyl group linked to silicone, unique skin feel and conditioning properties result. The compounds of the prior art have the ester moiety linked through a water-soluble polyoxyalkylene group, resulting in a surface-active agent with different properties than the compounds of the present invention. The compounds linked through the polyoxyalkylene group are less efficient emulsifiers and do not provide the same degree of conditioning to the skin.

It was not until the compounds of the present invention that molecules having a water-soluble group, silicone soluble group, fatty soluble groups as well as a cationic group were available.

SUMMARY OF THE INVENTION

The present invention is directed toward the provision of a series of novel silicone compounds that have ester groups linked through a hydrophobic group to silicon. The water-soluble hydroxyl groups are likewise linked directly to silicon. The compounds of the present invention provide superior foam, wetting and emulsification properties as well as outstanding lubrication properties. This allows for the preparation of very mild conditioning useful in the formulation of personal care products. The compounds of the present invention have the formula:

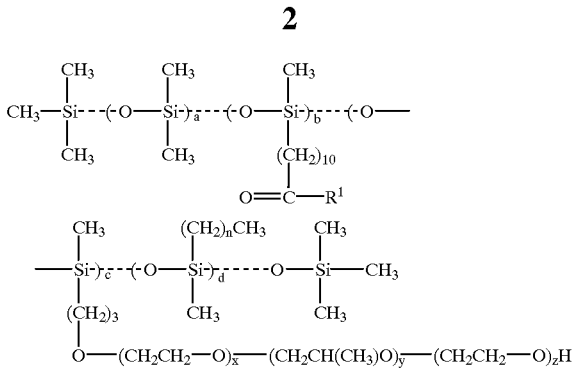

wherein;
a is an integer ranging from 0 to 2000.
b is an integer ranging from 1 to 20;
c is an integer ranging from 1 to 20;
d is an integer ranging from 0 to 20;
n is an integer ranging from 10 to 20;
x is an integer ranging 0 to 20;
y is an integer ranging 0 to 20;
z is an integer ranging 0 to 20;
$R^1$ is selected from the group consisting of

and

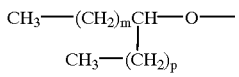

l is an integer ranging from 5 to 39;
m and p are independently integers ranging from 3 to 18.

It should be clear from looking at the structure above that the molecular bulk of the alkyl group in the molecule is quite large and directed in a linear manner directly to silicone.

The compound of the present invention conforming:

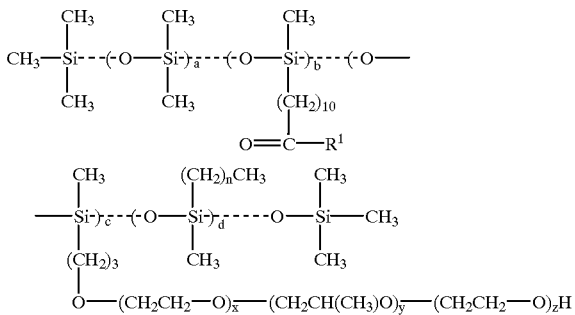

when $R^1$ has a large number of carbon atoms, the group is quite bulky. This effects how the molecule orientates itself on the surface of the hair, skin or textile fiber. In stark contrast, the products of U.S. Pat. No. 5, 180,834 issued January 1993 to O'Lenick, Jr. conform to the following structure:

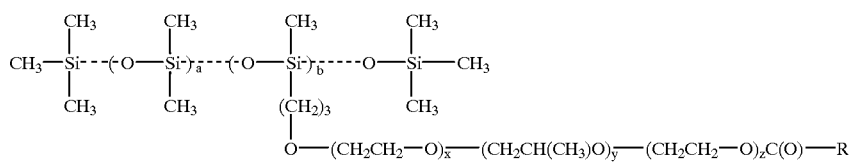

The ester is attached through the polyoxyalkylene group. Not only does this effect the alignment of the molecule on substrate, and consequently the surfactant properties, but also results in a product that is less hydrolytically stable. All ester bonds are subject to hydrolysis at low or high pH values, but products in which the ester is attached top a water-soluble group are much less hydrolytically stable than the same ester in which the ester is attached to a water insoluble group. Simply, the water has an easier time getting to the ester bond and hydrolyzing it The net result is a more stable, more surface active product that deposits more efficiently on hair skin and fiber. This results in more cost-effective formulation.

DETAILED DESCRIPTION OF THE INVENTION

Objective of the Invention

It is the object of the present invention is the provision of a series of novel silicone compounds that have specific hydrophilic ester groups linked through an 11-carbon linkage directly to silicon in a dimethicone backbone.

The compounds of the present invention conform to the formula;

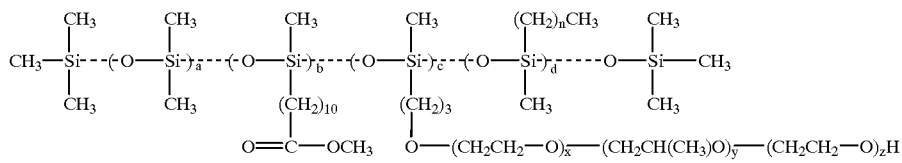

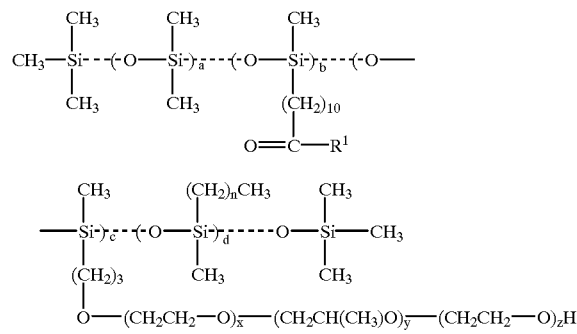

wherein;
a is an integer ranging from 0 to 2000;
b is an integer ranging from 1 to 20;
c is an integer ranging from 1 to 20;
d is an integer ranging from 0 to 20;
n is an integer ranging from 10 to 20;
x is an integer ranging 0 to 20;
y is an integer ranging 0 to 20;
z is an integer ranging 0 to 20;

$R^1$ is selected from the group consisting of

and

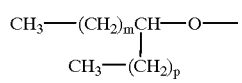

1 is an integer ranging from 5 to 39;
m and p are independently integers ranging from 3 to 18.

The products are made by reacting the following compounds with fatty alcohols and guerbet alcohols to give the compounds of the present invention.

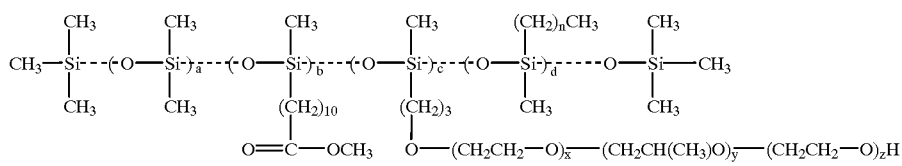

wherein;
a is an integer ranging from 0 to 2000;
b is an integer ranging from 1 to 20;
c is an integer ranging from 1 to 20;
d is an integer ranging from 0 to 20;
n is an integer ranging from 10 to 20;
x is an integer ranging 0 to 20;
y is an integer ranging 0 to 20;
z is an integer ranging 0 to 20.

The methyl ester is prepared by the hydrosilylation reaction of a silicone polymer and specific alpha vinyl compounds.

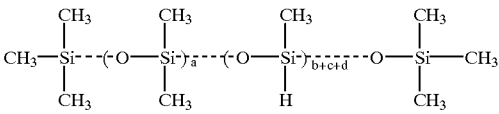

+b $CH_2$=CH—$(CH_2)_8$C(O)$OCH_3$ +c $CH_2$=CH—$CH_2$—O—$(CH_2CH_2$—O$)_x$—$(CH_2CH(CH_3)O)_y$—$(CH_2CH_2$—O$)_z$H +d $CH_2$=CH—$(CH_2)_{n-2}$—$CH_3$

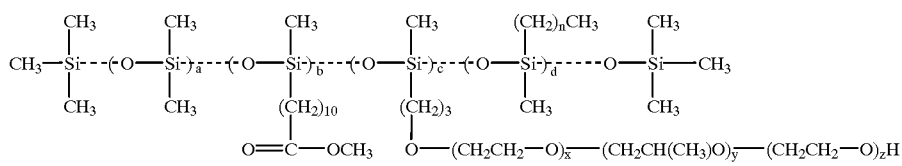

wherein;

a is an integer ranging from 0 to 2000;
b is an integer ranging from 1 to 20;
c is an integer ranging from 1 to 20;
d is an integer ranging from 0 to 20;
n is an integer ranging from 10 to 20;
x is an integer ranging 0 to 20;
y is an integer ranging 0 to 20;
z is an integer ranging 0 to 20.

The preparation of the intermediate is critical to the synthesis of the compounds of the present invention. If one tries to hydrosilylate a carboxylic acid directly, the reaction fails. The carboxylic acid group reacts with the Si—H and the desired product is not achieved. The hydrosilylation using the methyl ester however is essentially quantitative and proceeds to give the desired product.

Preferred Embodiments

In a preferred embodiment of the silicone polymer set d is 0.

In a preferred embodiment of the silicone polymer set d is an integer ranging from 1 to 20.

In a preferred embodiment of the silicone polymer set b in an integer ranging from 1 to 5.

In a preferred embodiment of the silicone polymer set b is an integer ranging from 6 to 20.

In a preferred embodiment of the silicone polymer set c is an integer ranging from 1 to 5.

In a preferred embodiment of the silicone polymer set c in an integer ranging from 6 to 20.

In a preferred embodiment of the silicone polymer set a is an integer ranging from 1 to 5.

In a preferred embodiment of the silicone polymer set a in an integer ranging from 6 to 20.

EXAMPLES

Raw Materials

1. Polymer Synthesis

Preparation of Silanic Hydrogen Containing Intermediates

Silicone intermediates of the type used to make the compounds of this invention are well known to those skilled in the art. International Publication (Silicone Alkylene Oxide Copolymers As Foam Control Agents) WO 86/0541 by Paul Austin (Sep. 25, 1986) p. 16 (examples 1 to 6) teaches how to make the following intermediates, and is incorporated herein by reference.

Hydrosilylation

Silanic Hydrogen Containing Compounds (Comb Type)

The polymers used as raw materials are known to those skilled in the art and conform to the following structure:

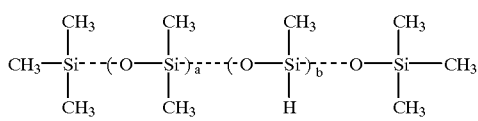

Compounds of this type are available from Siltech Corporation Toronto Ontario Canada.

| Example | Austin Example | a | b | Average Molecular Weight | Equivalent Molecular |
|---|---|---|---|---|---|
| 1 | 1 | 20 | 3 | 1,850 | 551 |
| 2 | 4 | 160 | 5 | 24,158 | 4,831 |
| 3 | 6 | 20 | 10 | 2,258 | 225 |

Compounds of this type are also available commercially from Siltech Corporation Toronto Ontario Canada. The structures were determined using silicone nmr and the chemistries were described using experimentally structures. Trade names are given merely for reference.

| Example | Siltech Name | a | b |
|---|---|---|---|
| 4 | Siltech D-116 | 9 | 4 |
| 5 | Siltech H-345 | 22 | 5 |
| 6 | Siltech C-106 | 50 | 10 |
| 7 | Siltech ZZ-302 | 70 | 20 |
| 8 | Siltech XX-456 | 50 | 60 |
| 9 | Siltech J-456 | 10 | 20 |
| 10 | Siltech G-456 | 0 | 60 |

2. Methyl Undecylenate

Example 11

Methyl undecylenate is an item of commerce and conforms to the following structure:

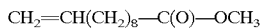

As previously stated, the reaction requires the reaction of an ester, not the acid directly. The reason for this is that is the reaction is conducted using undecylenic acid the acid group reacts with the Si—H and does not give the desired product. This is a critical unappreciated step in the practice of this technology.

3. Alkoxylated Allyl Alcohols

Alkoxylated allyl alcohol conforms to the following structure:

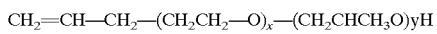

wherein x and y are integers independently ranging from 0 to 20.

Compounds of this type are also available commercially from Siltech Corporation Toronto Ontario Canada. The structures were determine using carbon nmr and wet analysis. The chemistries were described using experimentally determined structures. Trade names are given merely for reference.

| Example | x | y |
|---|---|---|
| 12 | 0 | 0 |
| 13 | 8 | 0 |
| 14 | 20 | 20 |
| 15 | 16 | 8 |
| 16 | 5 | 5 |
| 17 | 25 | 25 |
| 18 | 12 | 6 |
| 19 | 9 | 9 |
| 20 | 0 | 9 |

4. Alpha Olefin

Alpha olefins are items of commerce and are available from a variety of sources including Chevron. They conform to the following structure:

$$CH_2=CH-(CH_2)_s CH_3$$

s is an integer ranging from 3 to 50 and is equal to n-2.

| Example | s |
|---------|----|
| 21 | 8 |
| 22 | 10 |
| 23 | 12 |
| 24 | 14 |
| 25 | 18 |

5. Hydrosilylation

The hydrosilylation reaction used to make the compounds of this invention is well known to those skilled in the art. One of many references is International Publication (Silicone Alkylene Oxide Copolymers As Foam Control Agents ) WO 86/0541 by Paul Austin (Sep. 25, 1986) p. 19.
General Reaction Process (Hydrosilylation)

To a suitable flask fitted with a mechanical agitator, thermometer with a Therm-o-watch temperature regulator, nitrogen sparge tube vented reflux condenser and heating mantle is added the specified quantity of methyl undecylenate (example 11), allyl alcohol alkoxylates (examples 12–20), and alpha olefin (examples 21–25) examples . Next is added the specified number of grams of the specified hydrosilylation intermediate (Example # 1–10) and isopropanol. The temperature is increased to 85 C and 3.5 ml of 3% H2PtCl6 in ethanol is added. An exotherm is noted to about 95 C, while the contents are stirred for about 2 hours. During this time silanic hydrogen concentration drops to nil. Cool to 65 C and slowly add 60 g of sodium bicarbonate allow to mix overnight and filter through a 4-micron pad. Distill off any solvent at 100 C and 1 torr.

Example 26

To a suitable flask fitted with a mechanical agitator, thermometer with a Therm-o-watch temperature regulator, nitrogen sparge tube vented reflux condenser and heating mantle is added 200.0 grams of methyl undecylenate (example 11), 915.4 grams of allyl alcohol alkoxylate (example 16), 1687.7 grams of hydrosilylation intermediate (Example # 15) and 750 grams of isopropanol.

Heat to 85 C and add 3.5 ml of 3% $H_2PtCl_6$ in ethanol.

An exotherm is noted to about 95 C, while the contents are stirred for about 2 hours. During this time silanic hydrogen concentration drops to nil. Cool to 65 C and slowly add 60 g of sodium bicarbonate allow to mix overnight and filter through a 4-micron pad Distill off any solvent at 100 C and 1 torr.

Examples 26–55

| | Silanic Polymer | | Example 11 | Allyl Alkoxylate | | Alpha Olefin | |
|---|---|---|---|---|---|---|---|
| Example | Example | Grams | Grams | Example | Grams | Example | Grams |
| 26 | 1 | 2600.8 | 281.0 | 12 | 165.2 | 21 | 0 |
| 27 | 2 | 2617.0 | 42.0 | 13 | 348.1 | 21 | 0 |
| 28 | 3 | 497.1 | 218.0 | 14 | 2321.2 | 21 | 0 |
| 29 | 4 | 703.4 | 129.5 | 15 | 2188.6 | 21 | 0 |
| 30 | 5 | 1522.5 | 286.4 | 16 | 1238.7 | 21 | 0 |
| 31 | 6 | 522.7 | 46.1 | 17 | 2438.9 | 21 | 0 |
| 32 | 7 | 423.0 | 63.6 | 18 | 2524.0 | 21 | 0 |
| 33 | 8 | 387.3 | 102.1 | 19 | 2527.6 | 21 | 0 |
| 34 | 9 | 543.5 | 254.2 | 20 | 2244.7 | 21 | 0 |
| 35 | 10 | 1360.6 | 710.0 | 12 | 1046.6 | 21 | 0 |
| 36 | 1 | 2064.2 | 222.7 | 13 | 463.5 | 21 | 286.6 |
| 37 | 2 | 1942.5 | 31.1 | 14 | 991.7 | 22 | 39.9 |
| 38 | 3 | 691.9 | 121.3 | 15 | 2050.9 | 23 | 156.1 |
| 39 | 4 | 1223.6 | 225.2 | 16 | 1298.7 | 24 | 289.8 |
| 40 | 5 | 607.9 | 57.2 | 17 | 2270.9 | 25 | 73.6 |
| 41 | 6 | 1229.4 | 108.4 | 18 | 1540.8 | 21 | 139.4 |
| 42 | 7 | 886.1 | 80.0 | 19 | 1978.8 | 22 | 68.5 |
| 43 | 8 | 581.7 | 77.0 | 20 | 2255.8 | 23 | 98.6 |
| 44 | 9 | 1589.3 | 445.5 | 12 | 656.4 | 24 | 382.5 |
| 45 | 10 | 429.1 | 112.1 | 13 | 2333.2 | 25 | 144.3 |
| 46 | 1 | 1261.7 | 136.2 | 14 | 1449.7 | 21 | 175.2 |
| 47 | 2 | 2430.1 | 39.0 | 15 | 437.6 | 22 | 99.9 |
| 48 | 3 | 1038.5 | 182.2 | 16 | 1575.3 | 23 | 234.4 |
| 49 | 4 | 478.9 | 88.2 | 17 | 2334.1 | 24 | 113.4 |
| 50 | 5 | 1182.4 | 111.2 | 18 | 1581.8 | 25 | 143.1 |
| 51 | 6 | 1201.7 | 105.0 | 19 | 1573.8 | 21 | 136.3 |
| 52 | 7 | 1209.9 | 109.8 | 20 | 1605.6 | 22 | 93.6 |
| 53 | 8 | 1799.5 | 237.1 | 12 | 697.9 | 23 | 305.0 |
| 54 | 9 | 665.1 | 124.4 | 13 | 2071.2 | 24 | 160.1 |
| 55 | 10 | 123.1 | 64.3 | 14 | 2740.5 | 25 | 82.8 |
| 56 | 4 | 1066.0 | 197.0 | 13 | 1228.0 | 21 | 0 |
| 57 | 4 | 534.0 | 197.0 | 13 | 409.0 | 21 | 0 |
| 58 | 4 | 355.0 | 197.0 | 13 | 136.0 | 21 | 0 |

Ester Preparation of Examples 26–58

The compounds made in examples 26–58 are methyl esters as prepared. They are reacted with fatty alcohols to produce the ester of the present invention. The reaction is as follows;

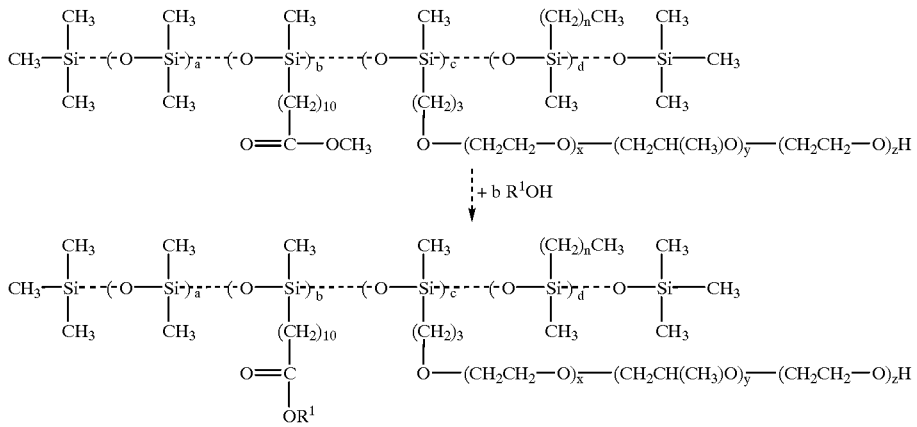

Raw Material Alcohols
Fatty Alcohols

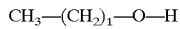

1 is an integer ranging from 5 to 39;
Fatty alcohols are available from a variety of manufacturer's. One is Condea.
Raw Material Example 1 1 is 11.
Raw Material Example 2 1 is 15.
Raw Material Example 3 1 is 17.
Raw Material Example 4 1 is 19.
Raw Material Example 5 1 is 39.

Guerbet Alcohols

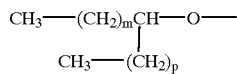

Guerbet Alcohols are items of commerce made by several manufacturer's including Condea.

Raw Material Example 6

Product group: Guerbet Alcohol
Chemical Product Name: 2-butyl octanol    m = 6    p = 3
CAS-Number: 3913-02-8

Raw Material Example 7

Product group: Guerbet alcohols
Chemical Product Name: 2-hexyl decanol    m = 9    p = 5
CAS-Number: 2425-77-6

Raw Material Example 8

Product group: Guerbet alcohols
Chemical Product Name: 2-octyl dodecanol    m = 10    p = 7
CAS-Number: 5333-42-6

Raw Material Example 9

Product group: Guerbet alcohols
Chemical Product Name: 2-decyl tetradecanol    m = 12    p = 9
CAS-Number: 58670-89-6

Raw Material 10

Product group: Guerbet alcohols
Chemical Product Name: 2-dodecyl hexadecanol    m = 14    p = 11
CAS-Number: 276-627-0

Raw Material Example 11

Product group: Guerbet alcohols
Chemical Product Name: 2-tetradecyl octadecanol    m = 16    p = 13
CAS-Number: 251-110-2

Raw Material Example 12

Product group: mono-branched fatty alcohol
Chemical Product Name: 2-hexadecyl eicosanol    m = 18    p = 17
CAS-Number: 241-637-6

Example 59–91

In a suitable reaction flask equipped with a thermometer, heating mantle, and a condenser to remove methanol is added the specified amount of the specified silicone methyl ester is added the specified number grams of the specified alcohol (Examples Raw Material Example 1-Raw Material Example 12). The reaction mass is heated to 190° C. to 200° C. The reaction begins at about 170° C. Allow the methanol to distill off as the reaction proceeds. After the reaction progress is followed by hydroxyl value which meets theoretical within 12 hours.

| | Methyl Ester | | Raw Material | Raw Material |
|---|---|---|---|---|
| Example | Example | Grams | Example Number | Alcohols Grams |
| 59 | 26 | 3047.0 | 1 | 186.0 |
| 60 | 27 | 3007.1 | 2 | 197.0 |
| 61 | 28 | 947.2 | 3 | 219.0 |
| 62 | 29 | 3021.5 | 4 | 241.0 |
| 63 | 30 | 3047.6 | 5 | 461.0 |
| 64 | 31 | 3007.7 | 6 | 185.0 |
| 65 | 32 | 3028.6 | 7 | 255.0 |
| 66 | 33 | 3016.4 | 8 | 297.0 |
| 67 | 34 | 3042.4 | 9 | 353.0 |
| 68 | 35 | 3117.2 | 10 | 409.0 |
| 69 | 36 | 3038.0 | 11 | 465.0 |
| 70 | 37 | 3005.3 | 12 | 549.0 |
| 71 | 38 | 3020.1 | 11 | 465.0 |
| 72 | 39 | 3037.6 | 10 | 409.0 |
| 73 | 40 | 3008.1 | 9 | 353.0 |
| 74 | 41 | 3017.8 | 8 | 297.0 |
| 75 | 42 | 3013.1 | 7 | 255.0 |
| 76 | 43 | 3012.7 | 6 | 185.0 |
| 77 | 44 | 3072.8 | 5 | 461.0 |
| 78 | 45 | 3018.2 | 4 | 241.0 |
| 79 | 46 | 3020.0 | 3 | 219.0 |
| 80 | 47 | 819.0 | 2 | 197.0 |
| 81 | 48 | 3029.7 | 1 | 186.0 |
| 82 | 49 | 3014.0 | 12 | 549.0 |
| 83 | 50 | 3018.6 | 11 | 465.0 |

-continued

| Example | Methyl Ester Example | Grams | Raw Material Example Number | Raw Material Alcohols Grams |
|---|---|---|---|---|
| 84 | 51 | 3106.7 | 10 | 409.0 |
| 85 | 52 | 3018.0 | 9 | 353.0 |
| 86 | 53 | 3038.6 | 8 | 297.0 |
| 87 | 54 | 3020.0 | 7 | 255.0 |
| 88 | 55 | 3010.5 | 6 | 185.0 |
| 89 | 56 | 2492.0 | 5 | 461.0 |
| 90 | 57 | 1140.0 | 4 | 241.0 |
| 91 | 58 | 688.0 | 3 | 219.0 |

Applications Examples

The compounds of the present invention are clear liquids when molten. Some are liquid at ambient temperatures, others are waxy solids, depending upon the number of carbon atoms in the fatty alcohol used for reaction. The branch pattern in the guerbet alcohol products makes the compounds liquid to lower temperatures.

The compounds of the present invention are very substantive to substrates like hair, skin and fiber. They provide a highly lubricious coating to these substrates. This suggests their use in personal care products like make up and other pigmented products. The compounds will also help disperse pigment and consequently can added to the pigment grind to make uniform particles.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed:

1. A silicone polymer conforming to the following structure:

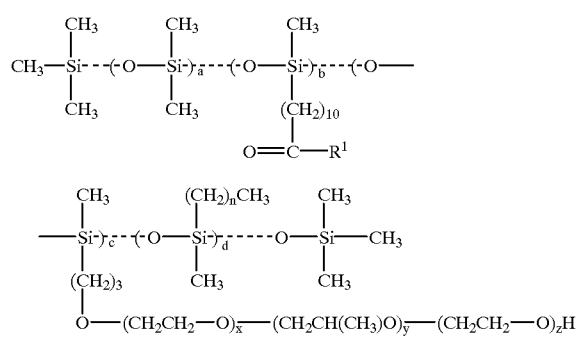

wherein;
a is an integer ranging from 0 to 2000;
b is an integer ranging from 1 to 20;
c is an integer ranging from 1 to 20;
d is an integer ranging from 0 to 20;
n is an integer ranging from 10 to 20;
x is an integer ranging 0 to 20;
y is an integer ranging 0 to 20;
z is an integer ranging 0 to 20;
$R^1$ is selected from the group consisting of $CH_3-(CH_2)_l-O-$;

and

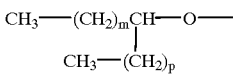

l is an integer ranging from 5 to 39;
m and p are independently integers ranging from 3 to 18.

2. A silicone polymer of claim 1 wherein d is 0.
3. A silicone polymer of claim 1 wherein d in an integer ranging from 1 to 5.
4. A silicone polymer of claim 1 wherein b is an integer ranging from 6 to 20.
5. A silicone polymer of claim 1 wherein c is an integer ranging from 1 to 5.
6. A silicone polymer of claim 1 wherein c in an integer ranging from 6 to 20.
7. A silicone polymer of claim 1 wherein a is an integer ranging from 1 to 5.
8. A silicone polymer of claim 1 wherein a in an integer ranging from 6 to 20.
9. A silicone polymer of claim 1 wherein $R^1$ is $CH_3-(CH_2)_l-O-$.
10. A silicone polymer of claim 2 wherein $R^1$ is $CH_3-(CH_2)_l-O-$.
11. A silicone polymer of claim 4 wherein $R^1$ is $CH_3-(CH_2)_l-O-$.
12. A silicone polymer of claim 6 wherein $R^1$ is $CH_3-(CH_2)_l-O-$.
13. A silicone polymer of claim 8 wherein $R^1$ is $CH_3-(CH_2)_l-O-$.
14. A silicone polymer of claim 1 wherein $R^1$ is

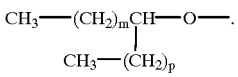

15. A silicone polymer of claim 2 wherein $R^1$ is $CH_3-(CH_2)_m\underset{CH_3-(CH_2)_p}{\overset{|}{CH}}-O-$.

16. A silicone polymer of claim 4 wherein $R^1$ is $CH_3-(CH_2)_m\underset{CH_3-(CH_2)_p}{\overset{|}{CH}}-O-$.

17. A silicone polymer of claim 6 wherein $R^1$ is $CH_3-(CH_2)_m\underset{CH_3-(CH_2)_p}{\overset{|}{CH}}-O-$.

18. A silicone polymer of claim 8 wherein $R^1$ is $CH_3-(CH_2)_m\underset{CH_3-(CH_2)_p}{\overset{|}{CH}}-O-$.

* * * * *